United States Patent [19]
Craig, Jr.

[11] Patent Number: 5,142,158
[45] Date of Patent: Aug. 25, 1992

[54] CANT DIMENSION READERE USING MOVING LIGHT SOURCE

[75] Inventor: William N. Craig, Jr., Lufkin, Tex.

[73] Assignee: Champion International Corporation, Stamford, Conn.

[21] Appl. No.: 700,860

[22] Filed: May 16, 1991

[51] Int. Cl.$^5$ .......................................... G01N 21/86
[52] U.S. Cl. ................................... 250/560; 356/387
[58] Field of Search ............... 250/560, 223 R, 561; 356/384, 387

[56] References Cited

U.S. PATENT DOCUMENTS 2,978,943  4/1961  Balint ................................. 250/560
4,887,219  12/1989  Strauser ............................. 250/560

*Primary Examiner*—David C. Nelms
*Assistant Examiner*—K. Shami

[57] ABSTRACT

After cutting of a cant, it is conveyed in a direction perpendicular to the long dimension of the cant against a pair of pin stops. A photo-diode array is positioned across the width of the cant adjacent one end of the conveyor and cant. The pins are aligned with one edge of the photo-diode array, which serves as a zero or reference point to measure the width of the cant. When the cant strikes the pin stops, a laser connected to a linear positioner having a servo-controlled hydraulic cylinder is extended by a piston along the opposite end of the conveyor until the emitted laser beam clears the the remote edge of the cant and strikes the photo-diode array. When the laser clears the cant and strikes the photo-diode array, the cant dimension is read from a transducer output associated with the linear positioner. Subsequent processing of the cant can be set, either manually or automatically, based on the dimension measured.

11 Claims, 1 Drawing Sheet

CANT DIMENSION READERE USING MOVING LIGHT SOURCE

BACKGROUND OF THE INVENTION

1. Field of the Invention

This invention relates to a measuring device, and more particularly, a device to check the width of a cant produced in a lumber production sawmill.

2. Description of the Prior Art

A cant is a piece of timber having sawn or chipped sides produced in a sawmill. Commonly, because the cant is cut from a log of varying diameter, the machined sides may not extend completely to the small end of the log, leaving the cant with rounded surfaces near the small end of the log. Prior to the apparatus of the present invention, there was no apparatus available to measure the cant accurately when the cants (1) are of varying lengths and (2) are presented to the subsequent processing machine with the small ends aligned to a reference line of the subsequent processing machine.

SUMMARY OF THE INVENTION

In accordance with the present invention, after cutting of the cant, it is conveyed in a direction perpendicular to the long dimension of the cant, against a pair of pin stops. A photo-diode array is positioned across the width of the cant adjacent one end of the conveyor and cant. The pins are aligned with one edge of the photo-diode array, which serves as a zero or reference point to measure the width of the cant. When the cant is positioned against the pin stops, a laser connected to a linear positioner is extended along the opposite end of the conveyor until its emitted laser beam clears the remote edge of the cant and strikes the photo-diode array. When the laser beam clears the cant and strikes the photo-diode array, the cant dimension is read from the transducer output of the linear positioner. The subsequent processing apparatus can be set, either manually or automatically, based on the dimension measured.

BRIEF DESCRIPTION OF THE DRAWING

Further objects and advantages of the invention will become more apparent from the following description and claims, and from the accompanying drawing, wherein:

DETAILED DESCRIPTION OF THE PREFERRED EMBODIMENT

Figure 1:
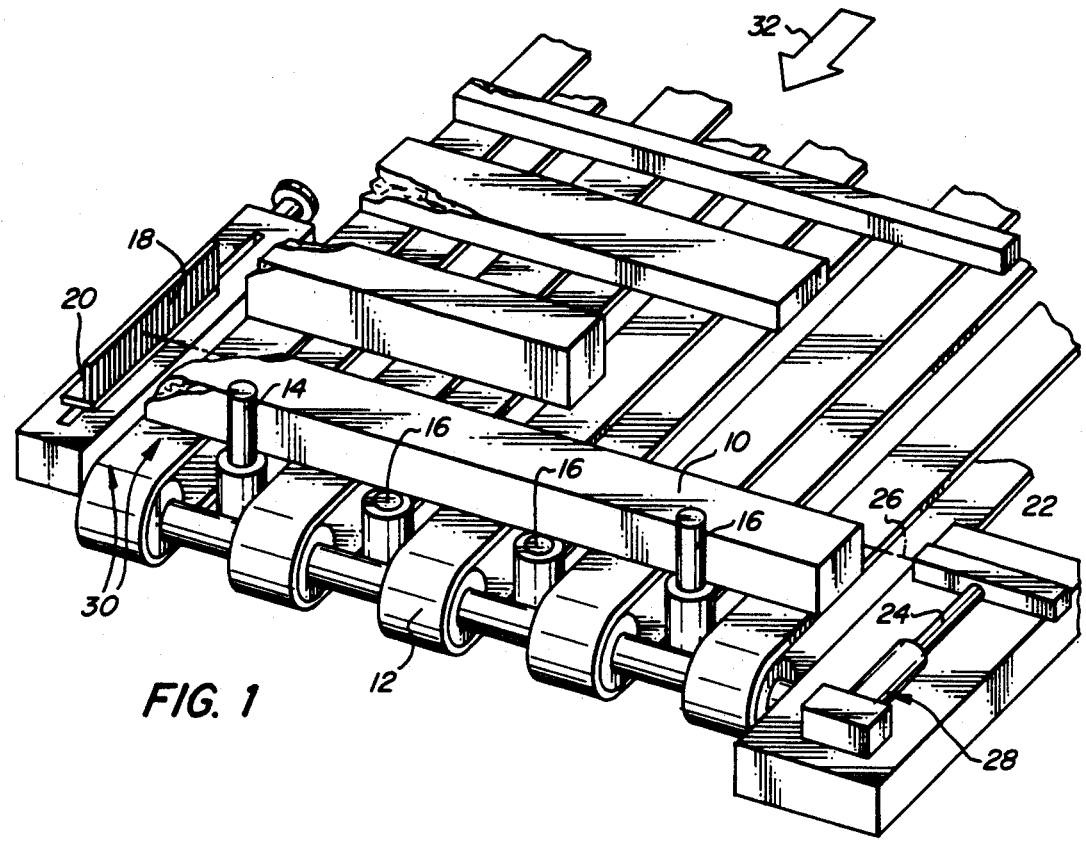
FIG. 1 is a partial perspective view of the cant dimension reading apparatus of the present invention.
Figure 2:
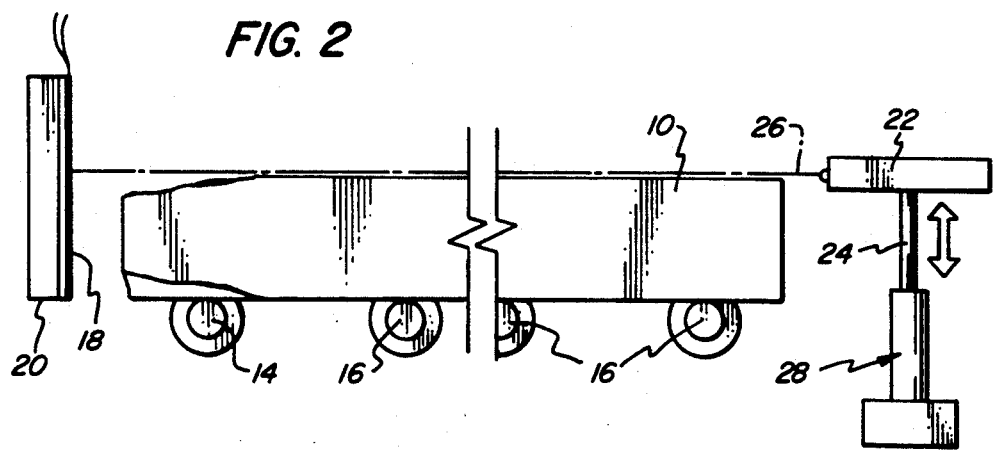
FIG. 2 is a top plan view of the front portion of the apparatus of FIG. 1.

Referring now to the drawing in detail wherein like numerals indicate like elements throughout the several views, after cutting of a cant 10, it is conveyed by a plurality of spaced belts or chains 12 against a pair of spaced vertically reciprocable, fluid motor driven pin stops including the stop 14 and one of the pin stops 16.

The cants ordinarily vary in length from eight to twenty feet, in two-foot increments. The pin stop 14 could be positioned at approximately 2.5 feet from the even-end line, while the pin stops 16 could be positioned at 7, 11 and 15 feet, respectively. The pin stop 14 would always be used, and the choice of the second pin stop 16 would be triggered by limit switches sensing the cant length as it is conveyed along belts 12 which are aligned with the pin stops 16. For example, the last limit switch sensing a length of the cant will activate the pin stop 16 aligned with it, overriding activation of any switch and pin stop 16 between it and pin stop 14.

A fixed photo-diode receptor array 18 is positioned across the width of the cant adjacent one side edge of the conveyor belts 12 and cant 10. The pins 14,16 are aligned with the front edge 20 of the photo-diode array 18, which serves as a zero or reference point to measure the width of the cant 10. When the cant 10 strikes the pin stops 14,16, a switch (not shown) can be activated to close a circuit to cause a laser 22 or other light source connected to a linear positioner 28 having, for example, a servo-controlled hydraulic cylinder and piston 24 and a precision displacement transducer (not shown), to be extended along the opposite end of the conveyor belts 12 until the emitted laser beam 26 clears the remote edge of the cant 10 and strikes the photo-diode array 18. When the laser beam 26 clears the cant 10 and strikes the photo-diode array 18, the cant dimension is determined from the amount of extension of the piston 24 of extended linear positioner 28 either manually by means of a numeric display or automatically, and subsequent processing of the cant based on the cant dimension so determined.

The cant dimension reading apparatus 30 of the present invention can be electrically controlled. When the cant 10 strikes the pin stops 14,16, a micro switch can be activated to extend the linear positioner 24 connected to the laser 22. When the laser beam 26 clears the remote edge of the cant 10, and activates the photo-diode array 18, the circuit to the linear positioner 24 can be opened, preventing further extension of the piston of hydraulic cylinder 24, or the motion of the hydraulic cylinder can be reversed until the emitted laser beam 26 is again blocked by the cant 10, at which time another reading can be taken from the precision displacement transducer, giving a verification of the first measurement.

The cant 10 can then be removed perpendicular to its direction of travel indicated by arrow 32 in FIG. 1, or the pin stops 14,16 can be formed by extensible pistons and withdrawn downwardly out of the path of the cant 10, and the cant allowed to continue to travel in the direction indicated by arrow 32 to subsequent processing apparatus.

If desired, an electric circuit which is activated to preclude further movement or reverse movement of the linear positioner 24 upon sensing of the laser beam 26 on the photo-diode array 18 can be used to activate a servo-motor or servo controlled piston for positioning the cutting implements (saws or chipping heads, etc.) on the subsequent processing apparatus so that the complete process can be automated.

What is claimed is as follows:

1. Apparatus for reading the dimension of a cant produced during a lumber forming process comprising:
   means for conveying said cant;
   stop means serving as a reference point provided in the direction of travel of the cant for contacting the cant and precluding further movement thereof along said conveying means;
   light sensitive means arranged along one dimension of said cant adjacent said conveying means;
   extensible light source means arranged along the opposite side of said cant adjacent said conveying means for activating said light sensitive means when said extensible position of said light source is beyond a remote edge of said cant when said cant is held against said stop means; and means for determining and quantifying the amount of extension of said extensible light source means after it has activated said light sensitive means whereby the dimension of said cant can be determined.

2. Apparatus in accordance with claim 1 wherein said quantifying means includes a precision displacement transducer integral with the extensible light source means.

3. Apparatus in accordance with claim 1 wherein said light sensitive means includes a photo-diode array.

4. Apparatus in accordance with claim 1 wherein said light source means is a laser.

5. Apparatus in accordance with claim 1 wherein said extensible light source means includes:

a light source mounted on one end of an extensible piston.

6. Apparatus in accordance with claim 5 wherein said extensible piston is in a servo-controlled hydraulic cylinder.

7. Apparatus in accordance with claim 5 wherein said light source is a laser.

8. Apparatus in accordance with claim 7 wherein said light sensitive means includes a photo-diode array.

9. Apparatus in accordance with claim 8 wherein said extensible piston is in a servo-controlled hydraulic cylinder.

10. Apparatus in accordance with claim 1 wherein said stop means includes a pair of spaced pins.

11. Apparatus in accordance with claim 10 wherein each of said pins is retractable to permit removal of said cant from said conveying means.

* * * * *

UNITED STATES PATENT AND TRADEMARK OFFICE
CERTIFICATE OF CORRECTION

PATENT NO. : 5,142,158
DATED : August 25, 1992
INVENTOR(S) : William N. Craig, Jr.

It is certified that error appears in the above—identified patent and that said Letters Patent is hereby corrected as shown below:

On the Title page, item [54] and column 1, line 2, delete the word "READERE" and insert in lieu thereof --READER--.

Signed and Sealed this

Twenty-first Day of September, 1993

Attest:

BRUCE LEHMAN

Attesting Officer    Commissioner of Patents and Trademarks